United States Patent [19]

Sorensen

[11] Patent Number: 5,436,508
[45] Date of Patent: Jul. 25, 1995

[54] WIND-POWERED ENERGY PRODUCTION AND STORING SYSTEM

[75] Inventor: Jens-Richard Sorensen, Sejero, Denmark

[73] Assignee: Anna-Margrethe Sorensen, Sejero, Denmark

[21] Appl. No.: 81,373

[22] PCT Filed: Feb. 12, 1992

[86] PCT No.: PCT/DK92/00044

§ 371 Date: Jul. 1, 1993

§ 102(e) Date: Jul. 1, 1993

[87] PCT Pub. No.: WO92/14054

PCT Pub. Date: Aug. 20, 1992

[30] Foreign Application Priority Data

Feb. 12, 1991 [DK] Denmark .................. 233/91

[51] Int. Cl.⁶ .................. F03D 9/02; F03D 1/06
[52] U.S. Cl. .................. 290/55; 290/44; 416/13; 416/15; 416/16
[58] Field of Search .................. 290/44, 55; 416/13, 416/15, 16

[56] References Cited

U.S. PATENT DOCUMENTS

| | | | |
|---|---|---|---|
| 2,329,675 | 9/1943 | Albers | 290/44 |
| 4,206,608 | 6/1980 | Bell | 290/55 |
| 4,230,531 | 10/1980 | Fernandopalle | 290/55 |
| 4,787,819 | 11/1988 | Bond | 416/15 |

FOREIGN PATENT DOCUMENTS

| | | |
|---|---|---|
| 371459 | 3/1923 | Germany . |
| 2812465 | 9/1979 | Germany . |
| 3008327 | 9/1981 | Germany . |
| 3210405 | 9/1983 | Germany . |
| 3231496 | 3/1984 | Germany . |

OTHER PUBLICATIONS

Park, The Wind Power Book, 1981, p. 142.

*Primary Examiner*—A. D. Pellinen
*Assistant Examiner*—Robert Hoyd Hoover
*Attorney, Agent, or Firm*—Browdy and Neimark

[57] ABSTRACT

A wind-powered energy production and storing system comprises a wind rotor (1) in driving engagement with a power generator via transmission means, to which is also connected a heat pump for operation of at least one heat exchanger unit. The wind rotor (1) is designed as a wind wheel having a rim in direct driving engagement with a main shaft positioned in a subjacent engine housing (3) to which main shaft, in addition to the power generator and the heat pump, a dual circulation pump is coupled for conveying heated and cooled liquid, from a heating container and a cooling container, respectively, positioned in the engine housing (3) to separate heat and cold storing stations (16, 18). Via a steam separator (21) and a pumping device (22), a steam generator (17) may be connected to the heat storing station (16), which via a steam turbine (19) drives an additional power generator (20) for power production during periods of slack winds.

15 Claims, 7 Drawing Sheets

WIND-POWERED ENERGY PRODUCTION AND STORING SYSTEM

The invention relates to a wind-powered energy production and storing system, comprising a wind rotor of a compact structure in driving engagement with a power generator via transmission means, to which is also connected a heat pump for operation of at least one heat exchanger unit.

Whereas wind rotors most often are used for production of electrical energy, possibly connected to a public supply network, systems are known from, i.e. SE-B-385613 and DE-A-3008327, according to which wind energy is used directly for heat generation without intermediate conversion to electricity.

The purpose of such plants has partly been to balance the irregularity in the occurrence of wind energy, partly to provide plants for use in areas where a coordination with electrical energy is not possible and where the primary energy requirement is heating.

With this as a starting point the objective of the invention is to provide a wind energy, system which is suited for simultaneous production of power and heat energy with a relatively high efficiency, in which a cold storing station is connected to the storing system for production of cold, and the heat energy by being stored can be used for power production in periods of slack winds.

A further objective of the invention is to vide a plant of the above-mentioned type with a comparatively simple, robust and compact structure, well suited for being erected in isolated areas where access to energy supply from the outside is non-existent or poor.

For this purpose a wind-powered energy production and storing system according to the invention is characterized in that the wind rotor is designed as a wind wheel having a rim in direct driving engagement with a main shaft positioned in a subjacent engine housing to which main shaft, in addition to the power generator and said heat pump, a dual circulation pump is coupled for conveying heated and cooled liquid from a heating container and a cooling container, respectively, positioned in the engine housing to separate heat and cold storing stations.

With the compact rotor structure, in which a wind wheel which in principle may be designed as it is known per se from DE-A-3210405 in direct driving engagement with a main shaft positioned in a subjacent engine housing to which both a power generator and other driving units serving for energy production are connected, an integrated wind energy plant of a simple structure is obtained.

The separate heat and cold storing stations may be designed as, e.g. sand-filled energy storages buried in soil and insulated.

By connecting a steam generator or boiler station to the heat storing station via a steam separator and exploiting the produced steam for power production by means of a turbine the possibility of maintaining power supply also in periods of slack winds is obtained, in addition to which excess power from the power generator positioned in the engine housing can be routed to the boiler station to be stored as surplus heat.

The output can be improved by using not only liquid as heating and cooling medium, respectively, but also air which is discharged from a blower positioned in the engine housing with temperature regulated air discharge either to the heat storing station or the cold storing station.

In the same way as it is known in principle from SE-B-400112, an automatic gale protection device may be connected to the wind rotor, designed as an oil pump coupled to the main shaft which via a hydraulic activator can activate a gale protection device which is spring-loaded in the normal operational condition of the wind wheel and which turns the wind wheel out of the wind if a certain wind velocity is exceeded.

The invention is further explained in the following with reference to the schematic drawing, in which FIG. 1 is a principal diagram illustrating an embodiment of a wind energy system according to the invention;

Figure 1:
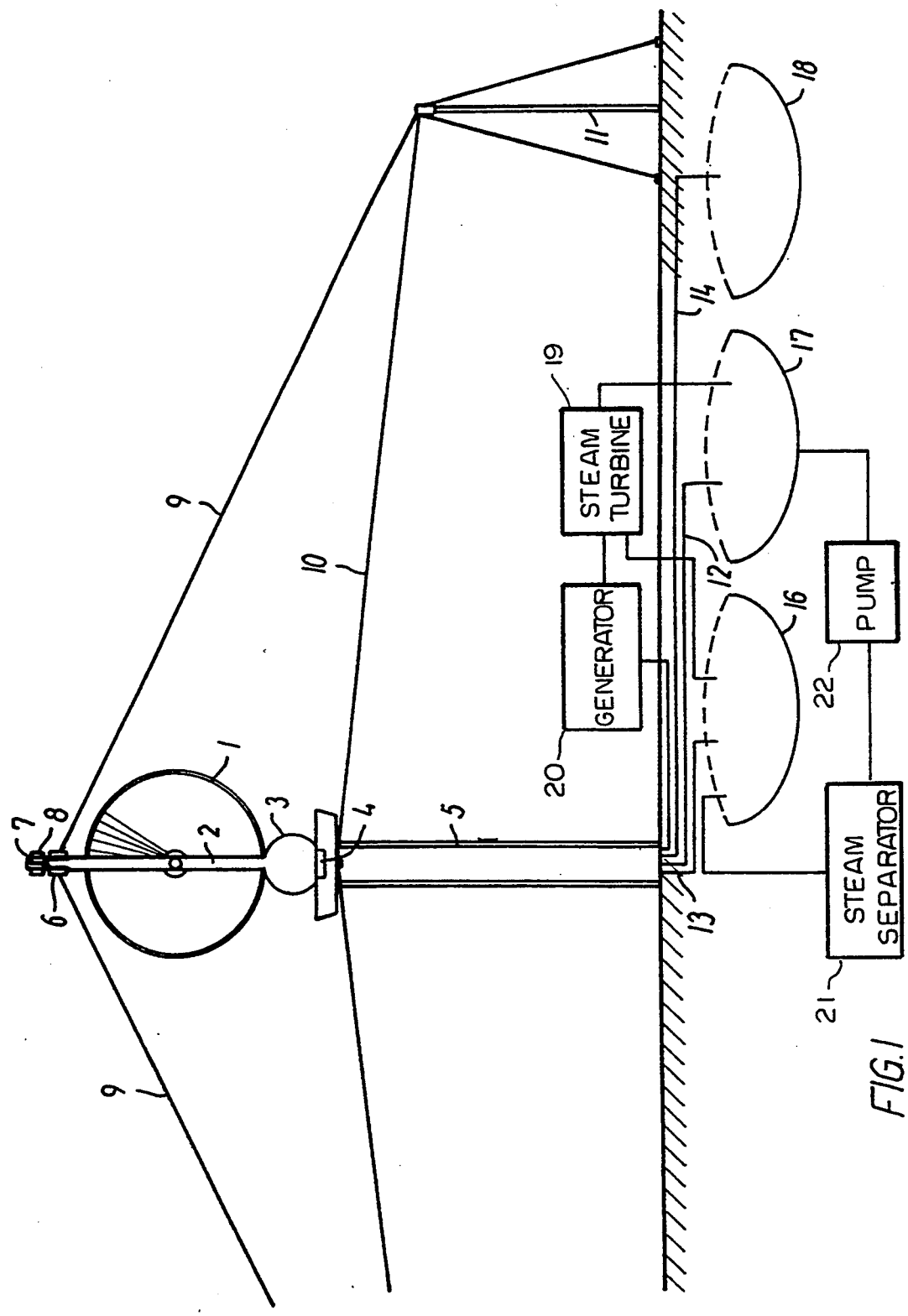

In the embodiment of a wind energy system according to the invention shown in FIG. 1 the rotor structure comprises a blade wheel 1 suspended in a fork 2, which is firmly fastened to a subjacent engine housing 3, in which the rim flange of the blade wheel 1 drives a main shaft as described in the following.

The subjacent engine housing 3 is pivotally journalled on the top of a pipe foundation 5 by means of a revolving ring 4, and above the blade wheel 1 the fork support 2 passes through a top bearing 6 for connection with a steering rudder 7 with gale fins 8.

The rotor structure is stabilized by means of a wire system with wires 9 and 10, which from the top bearing 6 and the upper part of the pipe foundation 5, respectively, at the revolving ring 4 are routed to poles or posts 11.

Cable and pipe connections 12, 13, 14 and 15 are routed through the pipe foundation 5 from the engine housing 3 via the revolving ring 4 for conveyance of electricity, and heat and cold carrying media to separate energy storages buried in soil, comprising a heat storing station 16, a boiler station or steam generator 17 and a cold storing station 18.

A steam turbine 19 with a coupled-up generator 20 is connected to the boiler station 17 for production of electricity in periods of slack winds.

The heat storing station 16 and the boiler station 17 are energywise connected via a steam separator 21 and a pump 22.

Various consumer installations not shown may be established at the heat storing station 16 and the cold storing station 18 in the same way as at the power generator.

The arrangement and function of the energy storing system will be explained in detail in the following.

Figure 2:
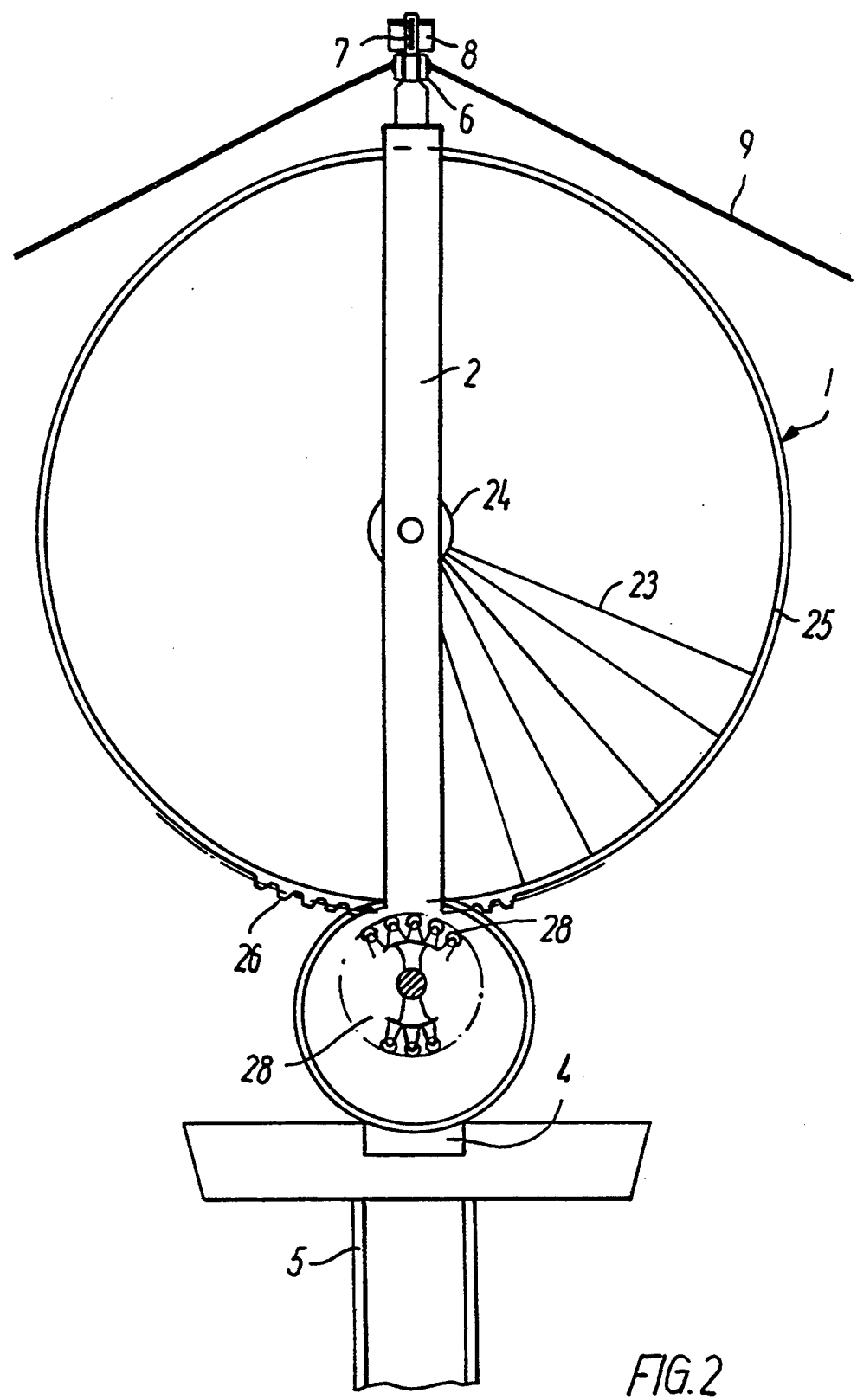
FIGS. 2 and 3 show an embodiment of the rotor structure.
Figure 3:
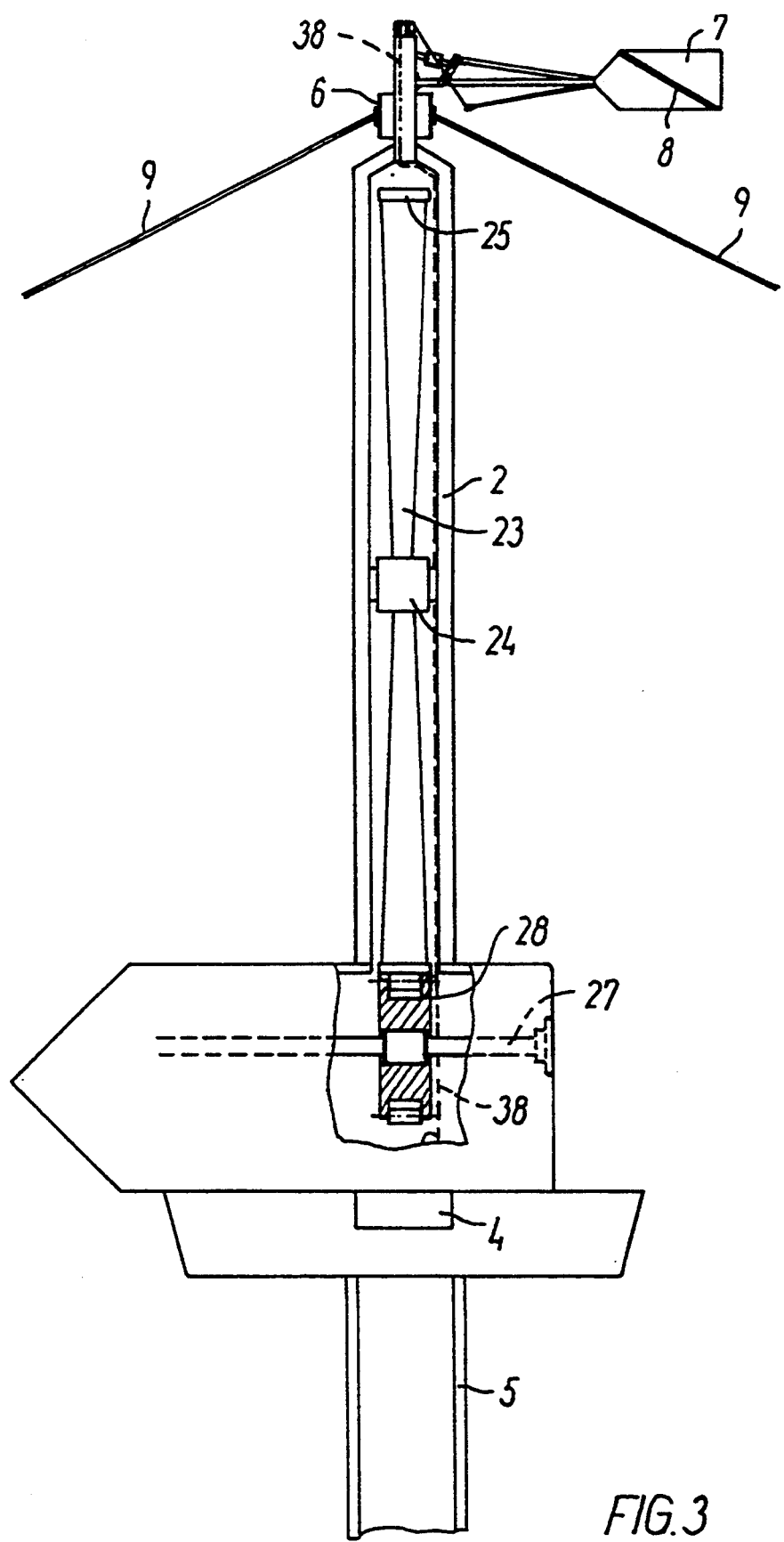

As it further appears from FIGS. 2 and 3, the wind wheel 1 has a large number of blades 23, e.g. 32, which are fixed between a hub 24 pivotally journalled in the fork support 2 and the rim flange 25 of the wheel. As shown at 26 in this embodiment the latter is provided with a toothed rim which in the engine housing 3 is in engagement with a smooth-running roller coupling 28 connected with the main shaft 27.

As another possibility, especially for smaller wind rotors, the rim flange 25 of the wind wheel 1 may be provided with a friction layer which drives a rubber wheel positioned on the main shaft, e.g. a twin wheel.

Figure 4:
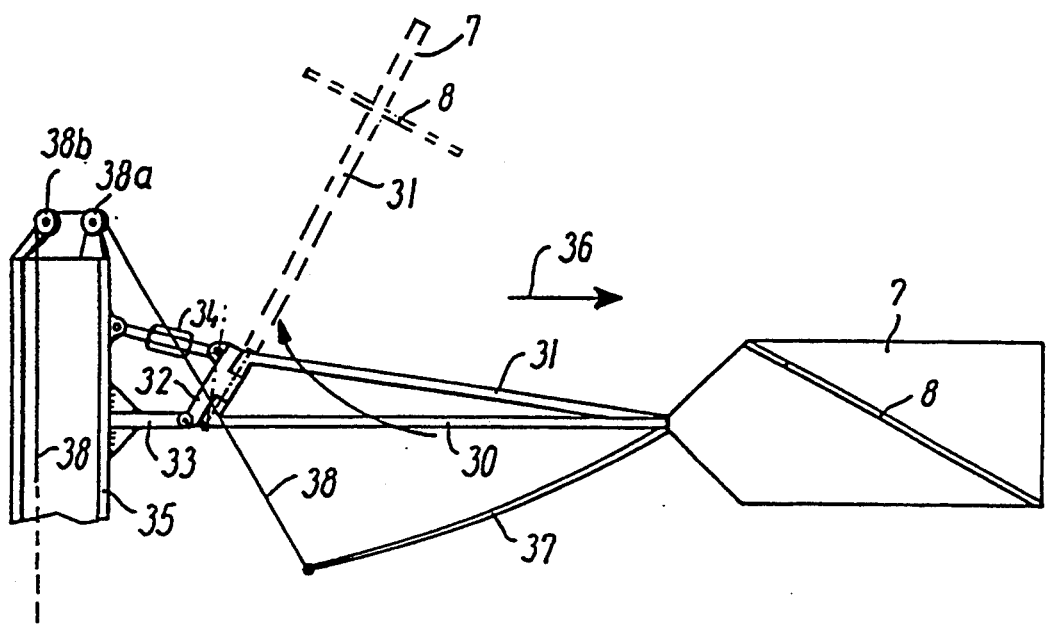
FIGS. 4 and 5 show further details of the gale protection device.
Figure 5:
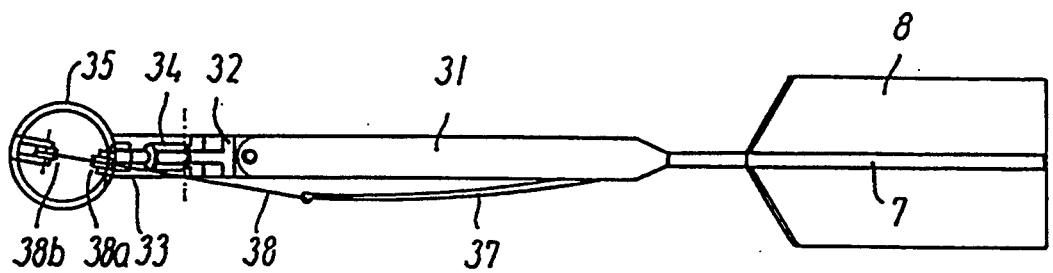

As it appears from FIGS. 4 and 5 the rudder 7 with its gale fins 8, which at both sides project at right angles and in relation to the rudder plane are almost diagonally oblique, typically at an angle of 30 degrees to the horizontal is connected to an oblique hinge 32 via connecting rods 30 and 31, said hinge being connected to a pipe section 35 firmly fastened to the fork support 2 via a supporting flange 33 and an adjustment connection 34 by means of which the angle to the vertical of the hinge 32 can be adjusted. The angle is typically 60 degrees.

Under normal wind conditions the rudder 7 will ensure that the wind wheel 1 is turned so that it is at right angles to the wind direction marked by an arrow 36. This position is stabilized by means of a spring 37, which from the connecting point of the rudder 7 and the rods 30, 31 extends inwards and downwards towards the fork support. The spring 37 is connected to a pull wire 38 which via reversing rollers 39 and 40 passes through the pipe section 35 and further along one leg of the fork support 2 down to the engine housing.

If the wind velocity in the direction marked by an arrow 36 exceeds a pre-determined value, the wind will affect the gale fins 8 in an upwards direction, whereby the rudder will revolve around the hinge 32 to the position shown in dotted line, whereby the rudder 7 turns the wind wheel out of the wind direction to a position parallel with same.

As explained in the following this movement is supported by the pull wire 38, as the wire is shortened when the rate of rotation of the main shaft exceeds a certain value.

Figure 6:
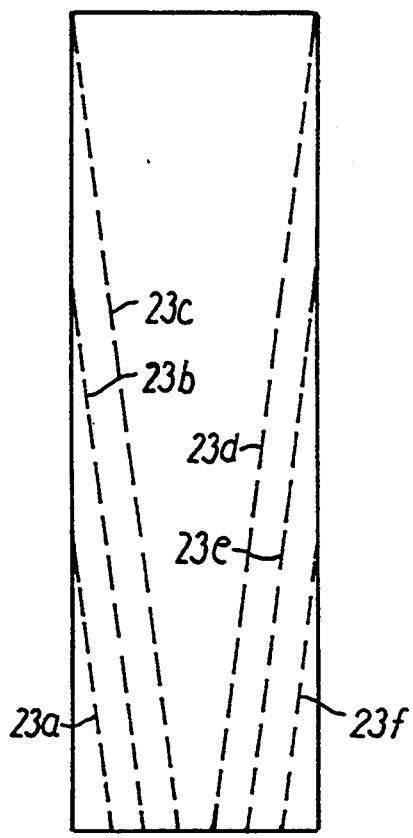
FIGS. 6 to 8 show further details of the design of a blade of the rotor structure.
Figure 7:
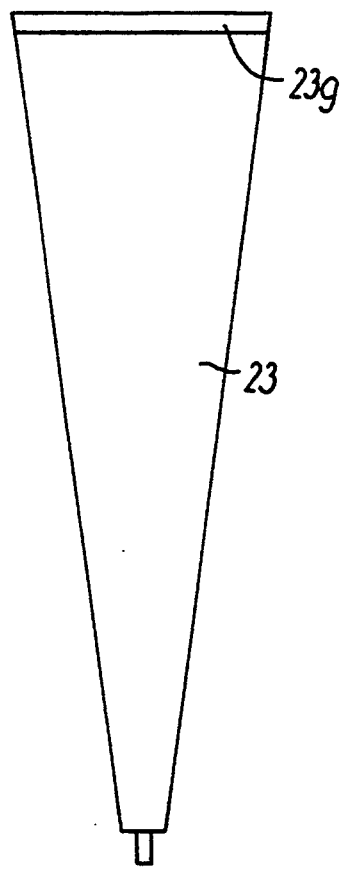
Figure 8:
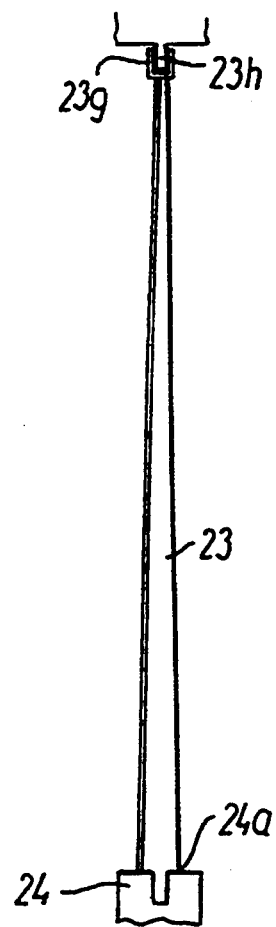

As shown in FIGS. 6-8 each of the blades 23 can be made of a folded rectangular metal sheet, e.g. stainless steel sheet folded along the lines 23a-23f shown in FIG. 6. At one end the sail is terminated by, e.g. a U-shaped bracket 23g, which by means of a number of bolts is fastened to, e.g. a T-shaped bracket 23h, welded to the underside of the rim flange, whereas the other end of the blade passes through an oval hole 24a in the hub 24 and is fastened by means of a nut.

A very stable and robust structure of the wind wheel is obtained hereby, with great safety against blades breaking or being torn off.

Figure 9:
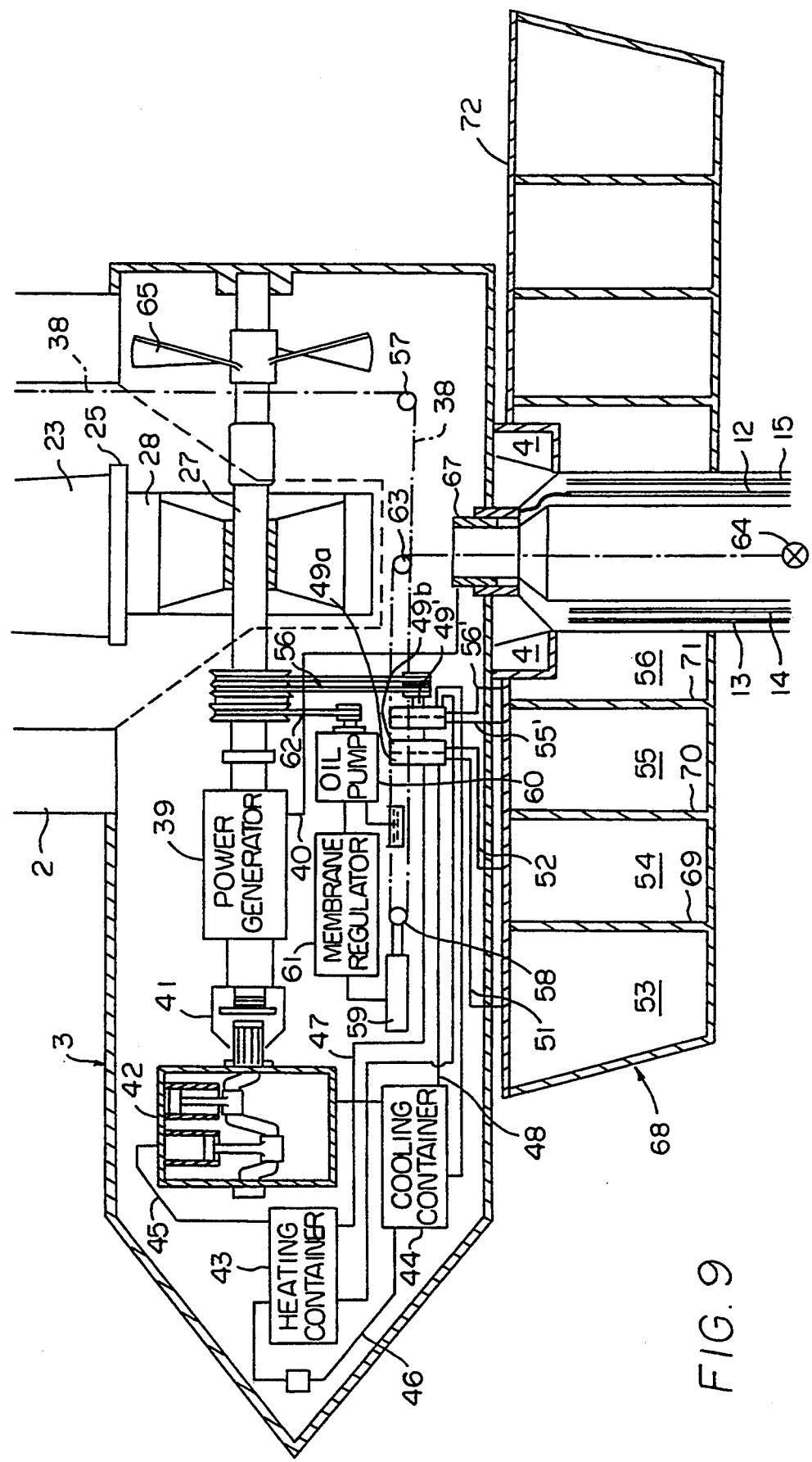
FIG. 9 shows the engine housing of the rotor structure with transmission means and units run by same.

As shown in FIG. 9 a power generator 39 is coupled up to the main shaft 27 in the engine housing 3, which supplies power to consumer installations not shown, and excess power is routed to the heat storing station 16 via a cable 40 to a slip ring 67 and through the cable 12 in the pipe foundation 5.

In addition, a dual heat pump 42 is connected to the main shaft 27 via a coupling 41, which together with a heating container 43 and a cooling container 44 form part of closed heating and cooling circuits. By compression of the heating/cooling liquid it is routed through a pipe line 45 to the heating container 43 where it gives off heat to the water volume contained therein. The liquid is routed through the pipe line 46 for nozzle atomization in the cooling container 44, whereby the coolant contained therein is cooled.

The heating and cooling containers 43 and 44 are via pipe lines 47 and 48 connected to respectively sections 49a, 49b of a dual circulation pump 49 which is run by the main shaft 27 via a belt drive. Heating and cooling liquid is routed from the circulation pump 49 through outlet pipes 51 and 52 to separate transfer chambers 53 and 54 which are connected with pipe lines 13 and 14 in the pipe foundation. Return flow pipes 55' and 56' for heating and cooling media are routed from separate transfer chambers 55 and 56 to an additional circulation pump 49'.

The engine housing 3 is pivotally supported on the pipe foundation by means of the revolving ring or the main bearing 4.

In the shown embodiment the transfer chambers 53-56 are designed as concentric cylindrical chambers in an almost basin-shaped container 68 fastened around the bearing 4 on the pipe foundation 5, in which the chambers 53-56 are separated by means of heat-insulated partition walls 69, 70 and 71, at the top provided with rubber packings not shown. The top of the container 68 with the walls 69-71 is covered by a lid 72 which is connected to the engine housing 3 for co-rotation therewith, for example by having carriers projecting downwards from the underside of the engine housing, engaging catching members on the lid 72 so that a certain relative angular rotation is allowed, e.g. 20°. Opposite each of the chambers 53-56 the lid is provided with connecting pieces for outlet pipes 51 and 52 and the return pipes 55' and 56', e.g. designed as tube connections leading to and from the circulation pumps 49, 49'.

Figure 10:
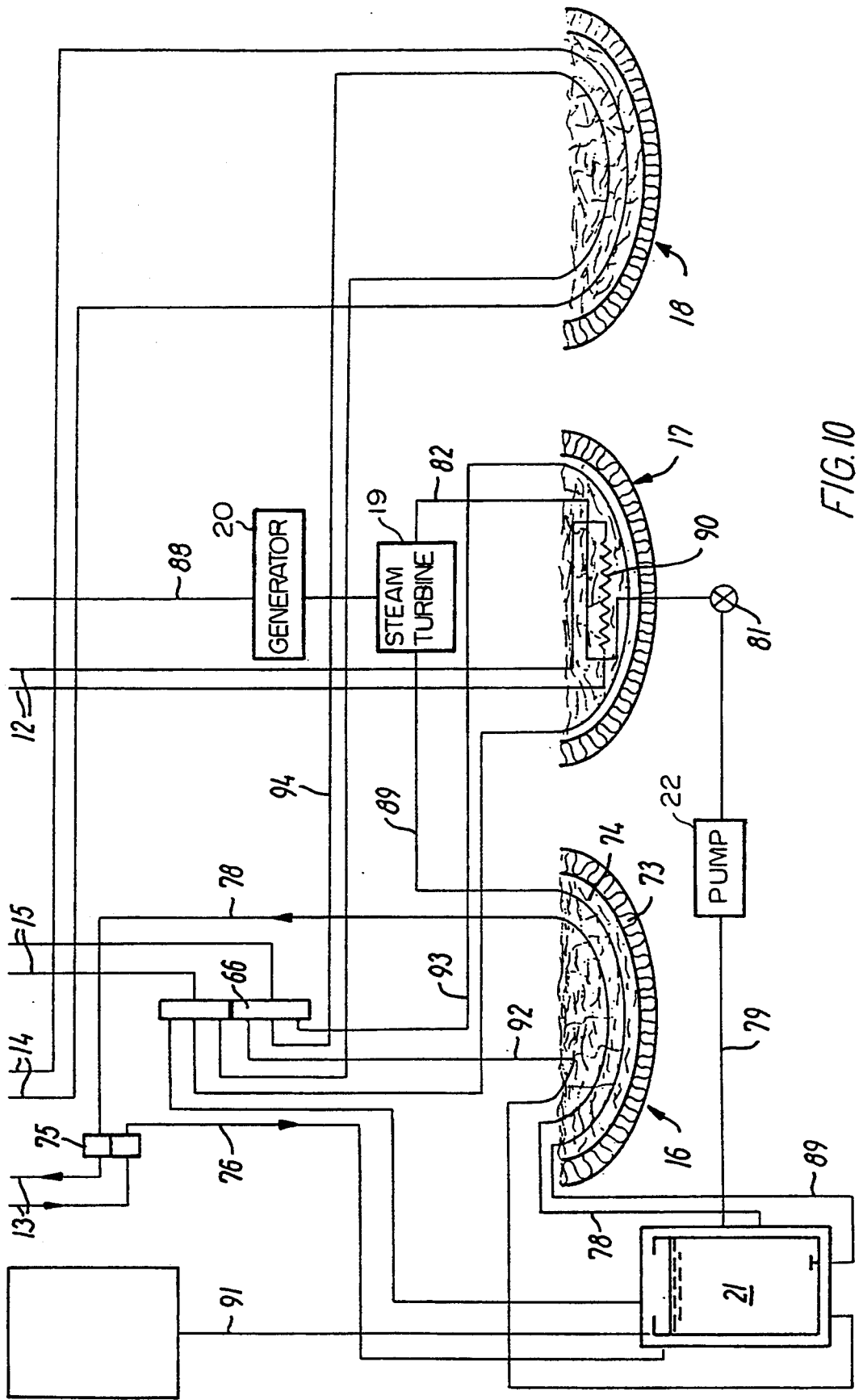
FIG. 10 is a schematic diagram of the conveyance of heating and cooling medium between the engine housing and separate heat and cold storing stations.

From the bottom of each of the chambers 53-56 pipe connections not shown are routed to the pipes 13 and 14 which serve for both forward flow and return flow in the pipe foundation 5 as shown in FIG. 10.

The pull wire 38 shown in dotted line is via a reversing roller 57 in the engine housing 3 wound around a roller 58 connected to the piston of an hydraulic actuator 59 which via a membrane regulator 61 can be activated by means of an oil pump 60 which is run by the main shaft 27 via a belt drive 62. The pull wire is routed from the roller 58 via a further reversing roller 63 into the pipe foundation 5 to a manually operated winch 64, by means of which the length of the pull wire can be adjusted.

At increasing oil pressure occurring if the rate of rotation of the main shaft 27 exceeds a certain value, the actuator 59 is affected via the membrane regulator 61 and exerts a pull on the part of the pull wire 38 which runs upwards along the fork support 2 to the rudder 7. The pull wire 38 will then turn the rudder 7 around the oblique hinge 32.

The efficient function of the gale protection is thereby threefold ensured, as it is activated immediately at too high wind velocity, and in part because it is actuated via the hydraulic activator at too high a rate of rotation of the main shaft of the engine housing, and partly can be ensured mechanically by means of the winch 64.

A blower 65 with air suction through a grating at one end wall of the engine housing 3 may be connected to the main shaft 27.

The displaced engine air can thereby be routed to the energy stations 16-18 via the pipe line 15 through the pipe foundation 5 and a thermostat-adjusted distributor device 66.

In addition, the engine housing is provided with not shown bearings and braking devices for the main shaft as well as suspension means and other accessories.

The separate energy storages 16, 17 and 18 may as already mentioned be designed as storages buried in soil, e.g. in the form of elliptical depressions with heat-insulated linings 73 of mineral wool or a similar material and with a filling 74 of dry sand, gravel, stones or similar materials as shown in FIG. 10.

The pipes 13 for heat carrying medium are routed to a transfer unit 75, from which a pipe or tube 76 is routed to the steam separator 21, from which a connection 78 from a lower level is routed through the heat storing station 16 back to the transfer unit 75.

From the steam separator 21 at a level between the inlet 76 and the outlet 78 to the heat storing station a water discharge 79 leads via the pump 22 and a thermostat-controlled valve 81 to the bottom of the steam generator or the boiler station 17 and through this via a tube 82 to the steam turbine 19, which runs the power generator 20 supplying power via the cable 88.

The discharge pipe 89 from the steam turbine is routed through the heat storing station 16 to the bottom of the steam separator 21.

Excess pressure air from the steam separator 21 may be routed through a pipe 91 to an expansion tank not shown which is provided with a safety valve.

The valve 81 is adjusted so that it, e.g. closes off the inlet to the steam generator 17 when the temperature falls below 120°, whereby the steam turbine 19 is disconnected via a pressure valve.

The electrical control may for example consist in a solenoid valve being arranged in the connection 79 between the steam separator 21 and the pump 22, said valve being kept closed while the voltage in the electrical grid to which the system is connected has its normal stable value, but is opened by a spring when the solenoid valve is deactivated whereby steam production to the turbine 19 may begin when the pressure in the steam separator 21 and thereby the temperature are sufficiently high to open the valve 81.

Not shown adjustment members for number of revolutions and steam supply may be provided for the steam turbine 19 as well as not shown control and adjustment members for the generator 20 for adjustment of the power supplied by same.

To improve the output of the steam generator 19 additional storing is established in same by routing excess power from the generator 39 in the engine housing through the cable 12 and over the resistance coil 90.

The cooling medium from the cooling container 44 in the engine housing 3 is routed through the pipe 14 to the cold storing station 18 from where it can be tapped and used for cooling purposes such as, e.g. freezing or air conditioning via a secondary circuit not shown.

By means of the blower 65 both heating and air can be routed through the pipe 15 in the pipe foundation 5 to the transfer unit 66, from which point pipes have been routed through the heat storing station 16 with the steam separator 21, the steam generator 17 and the cold storing station 18, respectively.

The invention thus provides an integrated energy production and storing system which, however, does not necessarily have to comprise the structural details described above, since numerous modifications will be possible within the scope of the subsequent claims.

I claim:

1. A wind-powered energy production and storing system, comprising a wind rotor (1) of a compact structure in driving engagement with a power generator (39) via transmission means (28), to which is also connected a heat pump (42) for operation of at least one heat exchanger unit, wherein the wind rotor (1) is a wind wheel having a rim (25) in direct driving engagement with a main shaft (27) positioned in a subjacent engine housing to which main shaft, in addition to the power generator (39) and said heat pump (42), a dual circulation pump (49, 49') is coupled for conveying heated and cooled liquid from a heating container (43) and a cooling container (44), respectively, positioned in the engine housing (3) to separate heat and cold storing stations (16, 18).

2. A wind-powered energy production and storing system as claimed in claim 1, characterized in that a steam separator (21) energywise connected to the separate heat storing station (16) and a pumping device (22) are connected to a steam generator (17) which via a steam turbine (19) drives an additional power generator (20) for power production during periods of slack winds.

3. A wind-powered energy production and storing system as claimed in claim 2, characterized in that a blower (65) positioned in the engine housing (3) can optionally be connected to the main shaft (27), said blower having temperature controlled air discharge to the heat storing station (16) and/or the cold storing station (18) and/or said steam generator.

4. A wind-powered energy production and storing system as claimed in claim 3, characterized in that an oil pump (60) is connected to the main shaft (27) which via a hydraulic activator (59) can activate a gale protection device which is spring-loaded in the normal operational condition of the wind wheel and which turns the wind wheel (1) out of the wind when a certain wind velocity is exceeded.

5. A wind-powered energy production and storing system as claimed in claim 4, characterized in that the rim of the wind wheel (1) is provided with a toothed rim (26) in engagement with a roller coupling (28) connected to the main shaft (27).

6. A wind-powered energy production and storing system as claimed in claim 5, characterized in that the wind wheel (1) is journalled in a fork support (2), which is firmly fastened to the engine housing (3), which by means of a revolving ring (4) is pivotally journalled in a pipe-shaped foundation (5), whereas both said foundation (5) and a top bearing (6) for the fork support (2) is stabilized by means of a wire system (9, 10, 11).

7. A wind-powered energy production and storing system as claimed in claim 5, characterized in that the wind wheel (1) has blades (23) made of folded metal sheet and fastened partly to the rim (25) of the wind wheel (1) by means of brackets (23g, 23h) adapted for this purpose, partly to the hub (24) of the wind wheel.

8. A wind-powered energy production and storing system as claimed in claim 1, characterized in that a blower (65) positioned in the engine housing (3) can optionally be connected to the main shaft (27), said blower having temperature controlled air discharge to the heat storing station (16) and/or the cold storing station (18) and/or said steam generator.

9. A wind-powered energy production and storing system as claimed in claim 1, characterized in that an oil pump (60) is connected to the main shaft (27) which via a hydraulic activator (59) can activate a gale protection device which is spring-loaded in the normal operational condition of the wind wheel and which turns the wind wheel (1) out of the wind when a certain wind velocity is exceeded.

10. A wind-powered energy production and storing system as claimed in claim 1, characterized in that the rim of the wind wheel (1) is provided with a toothed rim (26) in engagement with a roller coupling (28) connected to the main shaft (27).

11. A wind-powered energy production and storing system as claimed in claim 1, characterized in that the wind wheel (1) is journalled in a fork support (2), which is firmly fastened to the engine housing (3), which by means of a revolving ring (4) is pivotally journalled in a pipe-shaped foundation (5), whereas both said foundation (5) and a top bearing (6) for the fork support (2) is stabilized by means of a wire system (9, 10, 11).

12. A wind-powered energy production and storing system as claimed in claim 11, characterized in that the gale protection device comprises oblique gale fins (8) projecting at both sides of a rudder (7) serving for directional adjustment of the wind wheel (1) and connected to the fork support (2) via an oblique hinge (32), which allows turning the rudder (7) from its normal operational position parallel to the direction of the wind (3) to a position at right angles to same in order to turn the wind wheel out of the wind.

13. A wind-powered energy production and storing system as claimed in claim 12, characterized in that the gale protection device besides being capable of activation by means of hydraulic activator (59) and by said gale fins (8) also can be operated manually by means of a pull wire (38, 64).

14. A wind-powered energy production and storing system as claimed in claim 1, characterized in that the wind wheel (1) has blades (23) made of folded metal sheet and fastened partly to the rim (25) of the wind wheel (1) by means of brackets (23g, 23h) adapted for this purpose, partly to the hub (24) of the wind wheel.

15. A wind-powered energy production and storing system as claimed in claim 1, characterized in that the separate heat and cold storing stations (16, 18) and said steam generator (17) are designed as heat insulated energy storages buried in soil and having a filling (74) of sand, stones or similar materials.

* * * * *